UNITED STATES PATENT OFFICE.

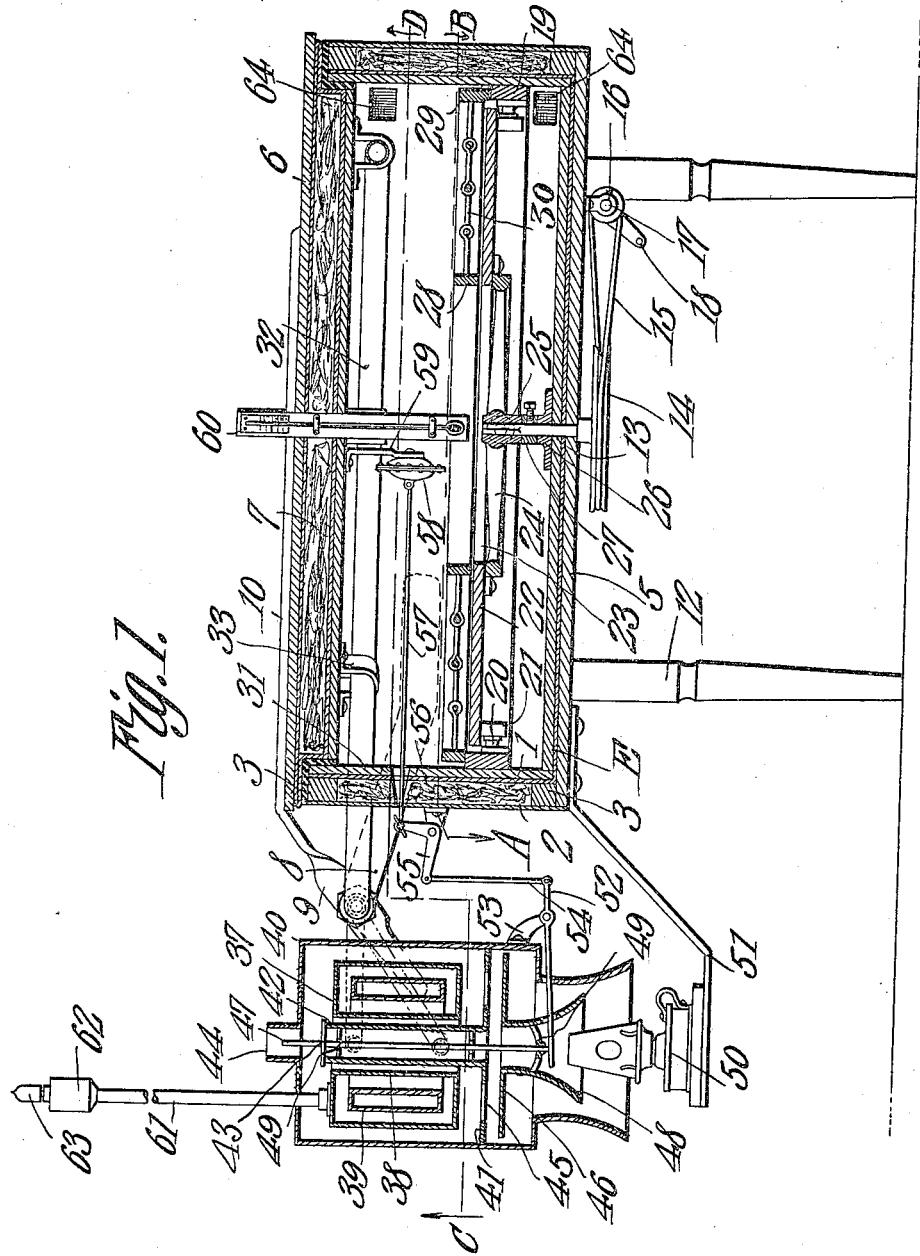

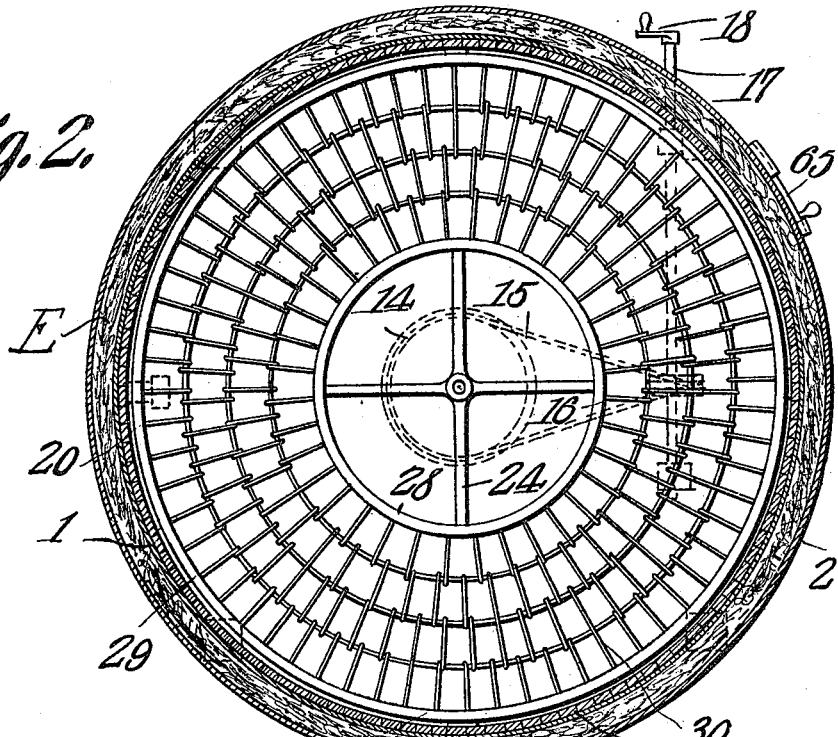
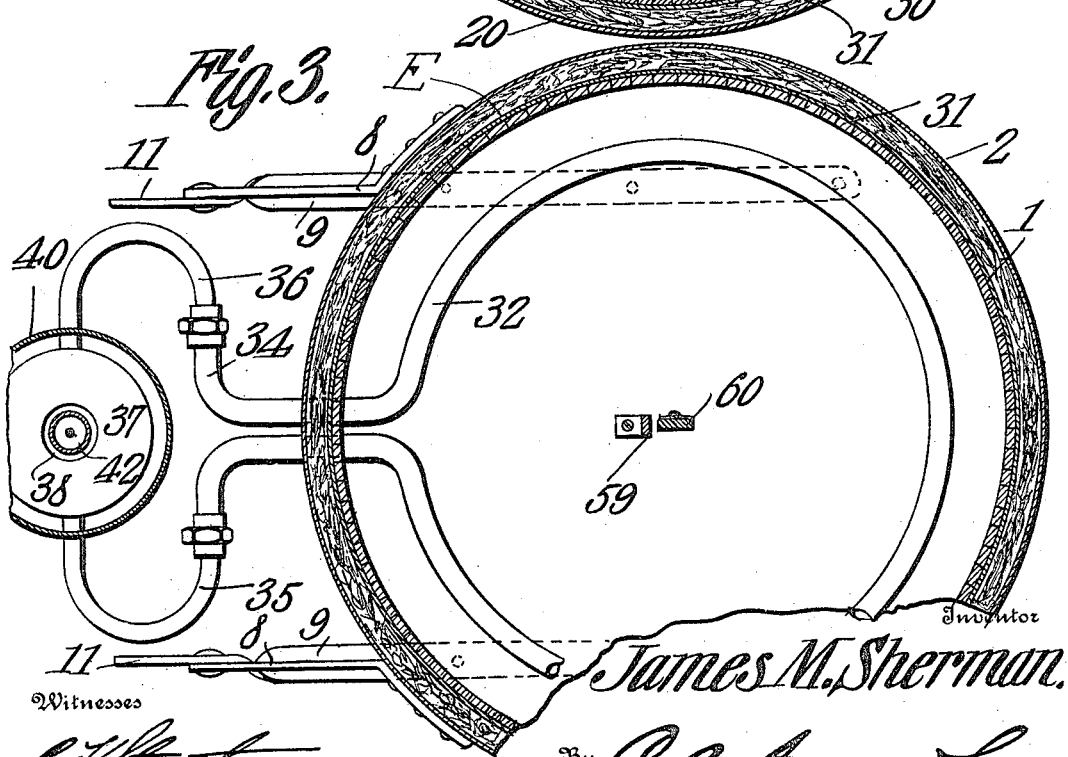

JAMES M. SHERMAN, OF COLUMBIA, MISSOURI.

INCUBATOR.

962,594.

Specification of Letters Patent. Patented June 28, 1910.

Application filed May 8, 1909. Serial No. 494,795.

*To all whom it may concern:*

Be it known that I, JAMES M. SHERMAN, a citizen of the United States, residing at Columbia, in the county of Boone and State of Missouri, have invented a new and useful Incubator, of which the following is a specification.

This invention relates to incubators and one of its objects is to provide a device of this character having a movable top to which a portion of the heating section of the incubator is connected, said portion being movable with the top when the incubator is opened for the purpose of inspecting the contents thereof.

A further object is to provide a tray of novel form for supporting eggs within the incubator, said tray consisting of a novel arrangement of parts whereby the eggs can be turned without the necessity of opening the incubator.

Another object is to provide a heater and regulating mechanism so constructed as to maintain the temperature within the incubator at any predetermined degree.

With these and other objects in view the invention consists in certain novel details of construction and combinations of parts hereinafter more fully described and pointed out in the claims.

In the accompanying drawings the preferred form of the invention has been shown.

In said drawings:—Figure 1 is a central vertical longitudinal section through an incubator embodying the present improvements. Fig. 2 is a horizontal sectional view on the line A—B Fig. 1. Fig. 3 is a section on line C—D Fig. 1.

Referring to the figures by characters of reference E designates the casing of the incubator, the same consisting of inner and outer cylindrical walls 1 and 2 respectively, each of the walls being preferably formed of sheet metal, and both being spaced apart in any preferred manner, as by means of upper and lower hoops 3. Any suitable packing 4, of mineral wool or the like may be placed between the walls 1 and 2. The bottom of the casing is formed of disks 5 so arranged as to fit snugly between the walls 1 and 2. The top of the casing consists of a disk 6 having a cylindrical extension upon its lower face as indicated at 7, this extension being designed to project into and fit snugly within the upper portion of the casing E. Arms 8 extend beyond the casing, and pivotally connected to these arms are levers 9 the upper ends of which extend over and are secured to the cover 6 as indicated at 10. The other or lower ends of these levers may extend beyond the arms 8 so as to constitute handles 11 for facilitating the raising of the cover 6.

The casing E is of course mounted on suitable supports 12 and journaled within the middle portion of the bottom of the casing is a shaft 13, having a wheel 14 secured to its lower edge and below the casing, this wheel being driven in any preferred manner as by means of a belt 15 extending around a driving wheel 16 is secured to a transversely extending shaft 17, which, as indicated in Fig. 1, may be provided with a crank 18, whereby the shaft can be readily rotated. A supporting cleat 19 is secured within the casing E at a point above the bottom thereof and extending inwardly from this cleat are studs 20 on which are mounted anti-friction rollers 21. These rollers support a circular table 22 having a large central opening 23 which is intersected by spokes 24. These spokes radiate from a hub 25 removably mounted upon the shaft 13 but revoluble therewith. It is of course to be understood that the spokes 24 are secured to the table 22 in any preferred manner, so that when the shaft 13 is revolved the table 22 is also caused to rotate upon the rollers 21. A suitable bearing, such as a boss 26, is preferably mounted upon the bottom of the casing E and constitutes a support for the shaft 13. As shown in Fig. 1 the shaft 13 may be held against longitudinal movement by means of a collar 27 secured thereon and bearing on the boss 26.

Mounted upon the cleat 19 is a removable, but normally stationary, egg-holding member consisting of concentric hoops or rings 28 and 29, between which is interposed a body 30 consisting of inter-engaging wires, rods, wooden strips or the like spaced apart sufficient distances to permit the insertion of an egg into each of the spaces. This body does not of course extend across the inner ring 28, but a space is left clear within this ring, so that chicks can pass downward through the opening 23 and into the compartment formed below the revolving table 22.

In order to further assist in retaining heat within the casing E the inner wall 1 of said casing is preferably provided with a lining 31 consisting of wooden strips placed on end.

It is of course to be understood that when the eggs to be hatched are placed within the spaces between the members of body 30 they will rest upon the movable table 22. Should it be desired to turn the eggs it is merely necessary to rotate the shaft 17 by means of crank 18 and motion will therefore be transmitted through the wheel 16, belt 15 and wheel 14 to the shaft 13, and inasmuch as this shaft is secured to the table 22, it will be apparent that the table will revolve upon the anti-friction rollers 21. Inasmuch as the egg-holder formed by the rings 28 and 29 and the body 30 remains stationary it will be seen that the moving table will cause all of the eggs to simultaneously turn within the spaces in which they are mounted. When it is desired to remove the eggs from the incubator, or to place them therein, the table 22 and the holder thereabove may be lifted together inasmuch as the said table is removably mounted upon the shaft 13.

The heating apparatus used in connection with the incubator includes a coil 32 supported from the cover 6 in any preferred manner as by means of brackets 33. The end portions of the coil extend through openings in the walls of the casing E and are extended in opposite directions as indicated at 34, so as to aline with the pivots of the levers 9. These terminals are coupled to pipes 35 and 36 respectively, the pipe 35 being extended downwardly to the bottom portion of a boiler 37 and thus constituting a return pipe, while the pipe 36 opens into the upper portion of said boiler. As shown in Fig. 1 the boiler 37 is cylindrical and provided with a central longitudinal flue 38 therethrough, there being preferably a hollow ring 39 within the boiler and concentric with the flue and constituting a core, this ring being spaced from the flue as well as from all of the walls of the boiler. The boiler is supported within a drum 40, which is concentric therewith and spaced therefrom and this drum has a transverse partition 41 therein below the boiler. A tube 42 extends from the middle portion of this partition and upwardly through the flue 38 in the boiler, the two flues being spaced apart so as to permit the circulation of gases therebetween. The upper end of the flue 42 constitutes the seat for a damper 43, which normally rests thereon, this damper being disposed below an outlet 44 in the top of the drum 40. Openings 45 are formed in the partition 41 at points removed from the flue 42 and a ring 46 is suspended below these openings by a rod 47. This rod is fastened to the damper 43 and extends longitudinally within the flue 42, the lower end of the rod projecting into a chimney 48 which extends downwardly from the middle portion of the ring 46 and has a spider 49 therein to which the rod 47 is attached. The chimney 48 is disposed directly above a heating lamp 50 and supported upon a suitable bracket 51 extending from the casing E of the incubator. It will thus be seen that the heater is provided with two dampers 43 and 46 both of which move with the rod 47, the damper 43 being designed to close the upper end of the flue 42, while the damper 46 is designed to close the openings 45.

The means for automatically actuating the dampers preferably includes a lever 52 fulcrumed upon a bracket 53 extending from the drum 40, one end of the lever projecting into the chimney 48 and under the rod 47, the rod and lever being constantly in engagement. The other end of lever 52 is connected by a link 54 with one arm of a bell crank lever 55. This bell crank lever is fulcrumed upon a bracket 56 extending from casing E, and the other arm of the bell crank lever is connected by means of a detachable rod 57 to a thermostat 58 which is supported within the middle portion of the incubator and close to the opening 23, this thermostat, as shown in the drawings, being preferably held in place by means of a bracket extending from the top of the casing. This bracket has been shown at 59.

In order that the temperature within the casing may be accurately determined at all times a thermometer 60 is mounted within the cover 6 and extends downwardly therefrom so that the bulb of the thermometer is located close to the thermostat.

In order to prevent the water within the boiler 37 from overflowing when the coil 32 is elevated with the cover 6, a stand-pipe 61 is extended upwardly from the boiler so that the top thereof will be in a plane above the highest point reached by the coil 32 when elevated. The upper end of this stand-pipe may be provided with a compartment 62 and a safety valve 63 may if preferred be mounted upon the compartment. Obviously by providing a compartment 62 of sufficient size it does not become necessary to extend the stand-pipe upwardly to the height heretofore mentioned.

The boiler 37 and coil 32 may be filled with water by pouring the water into the stand-pipe 61 or by providing a separate inlet. After the system has been filled with water the heating lamp 50 is ignited and the products of combustion will pass into the chimney 48 and will then enter the openings 45 and circulate between the boiler 37 and the drum 40 and also between the flues 38 and 42. The temperature of the water within the boiler will thus be quickly raised and a circulation established through the coil, the water going outward through the pipe 36 and returning by way of pipe 35. As the temperature within the casing E rises the thermostat 58 shifts the rod 57 so as to actuate bell crank lever 55, and motion will thus be transmitted to lever 52, which will elevate the rod 47. The damper 43 will thus be unseated and will move the ring 46 into position to close the openings 45. The products of combustion will therefore pass directly from chimney 48 into the flue 42 and thence through the outlet 44, thus preventing further heating of the water within the boiler and causing the temperature of said water to rapidly diminish. Should it be desired to obtain access to the contents of the casing it is merely necessary to disconnect rod 57 from the lever 55 and swing the cover 6 upwardly and the coil 32 will of course move therewith. This is important because the hot water is kept in circulation while the cover is raised, and as soon as the cover is returned to closed position, the air within the casing is heated by the coil. The rod is mounted in a tapered opening in the wall of the casing and will not therefore retard the upward movement of the cover. Obviously the thermostat can be removed whenever desired. Also ventilating openings 64 can be formed in the top and bottom portions of the incubator, said openings being provided with slides 65 or other suitable closures.

It is of course understood that various changes may be made in the construction and arrangement of the parts without departing from the spirit or sacrificing the advantages of the invention.

What is claimed is:—

1. An incubator including a casing, an egg supporting element mounted for rotation within the casing and having a central opening, means below, and extending into the opening, for actuating said elements, and stationary means removably mounted above said egg supporting element for holding eggs against movement with the element.

2. An incubator including a casing, an egg supporting table mounted for rotation therein and having a central opening, means below and extending into the opening for transmitting motion to the table, stationary means removably mounted above the table for holding the eggs supported by the table, and means outside of the casing for actuating the table.

3. An incubator including a casing, movable egg supporting means therein, removable normally stationary means above said supporting means for holding the eggs against movement with said supporting means, a closure hingedly mounted upon the casing, a stationary heater, a heating coil connected to the closure, and a pivotal connection between said coil and the heater, said connection being disposed along the axis of the hinges of the closure.

4. An incubator including a casing, egg supporting means therein, a heater fixedly connected to the casing, a closure hingedly connected to said casing, a heating coil connected to the closure and normally located within the casing, and a pivotal connection between the coil and the heater, the axis of said connection and of the hinges being in alinement.

5. An incubator including a casing, a stationary heater fixedly connected thereto, egg supporting means within the casing, a closure hingedly connected to the casing, a heating coil mounted upon the closure and normally located within the casing, a pivotal connection between the coil and the heater, the axis of said connection being in alinement with the axes of the heaters, a thermostat for regulating said heater and movable with the closure, and a detachable connection between said thermostat and the heater.

In testimony that I claim the foregoing as my own, I have hereto affixed my signature in the presence of two witnesses.

JAMES M. SHERMAN.

Witnesses:
JAMES GORDON,
D. A. ROBNETT.